United States Patent [19]

Kuzma

[11] Patent Number: 5,583,569
[45] Date of Patent: Dec. 10, 1996

[54] VIDEO CAMERA HAVING ASYNCHRONOUS DIGITAL OUTPUT INCLUDING HEADER DATA

[75] Inventor: Andrew Kuzma, Portland, Oreg.

[73] Assignee: Intel Corporation, Santa Clara, Calif.

[21] Appl. No.: 293,141

[22] Filed: Aug. 19, 1994

[51] Int. Cl.$^6$ .................................................. H04N 7/08
[52] U.S. Cl. ......................... 348/239; 348/472; 348/473; 370/474
[58] Field of Search ...................................... 348/239, 461, 348/467, 472, 423, 473, 489, 222; 370/91, 94.1, 94.2, 110.1; H04N 7/08

[56] References Cited

U.S. PATENT DOCUMENTS

| | | | |
|---|---|---|---|
| 3,584,145 | 6/1971 | Cutler et al. | 370/110.1 |
| 5,115,426 | 5/1992 | Spanke | 370/110.1 |
| 5,122,875 | 6/1992 | Raychaudhuri et al. | 370/110.1 |
| 5,138,440 | 8/1992 | Radice | 348/472 |
| 5,287,182 | 2/1994 | Haskell et al. | 348/484 |

*Primary Examiner*—Safet Metjahic
*Assistant Examiner*—Jeffrey S. Murrell
*Attorney, Agent, or Firm*—William H. Murray; John V. Silverio

[57] ABSTRACT

A video camera is adapted to provide an asynchronous computer-friendly output signal instead of a standard analog video format. The output signal becomes a digitally-encoded message wherein each video frame becomes a serialized string of digital data demarcated by a digitally-encoded initiator identifying the ensuing data as characterizing that entire frame. The beginning of the entire set of frames that comprise the total video message is identified by a special header comprising a time stamp code and a format code.

12 Claims, 4 Drawing Sheets

VIDEO CAMERA HAVING ASYNCHRONOUS DIGITAL OUTPUT INCLUDING HEADER DATA

BACKGROUND OF THE INVENTION

This invention relates to video imaging, and, more particularly, to video cameras used for generating video images.

The advent of the video age was engendered by the development of the video camera. This device, which was originally in the form of a special video vacuum tube, produces output voltage variations that are proportional to a video image focused on it. In the case of modern video cameras, the output voltages include signals proportional to the intensity of the signal as well as to the color content of the signal. Modern technology provides these signals from solid state devices, such as a charge coupled device (CCD), wherein a stored-charge image is developed on a silicon chip which is scanned out by a solid-state array overlaid thereon.

A variety of formats are available for characterizing these signals, such as "YIQ" which is the United States' video broadcast standard format as developed by the National Television Systems Committee (NTSC). Another choice, developed in Europe, is the "YUV" format which is most often used in digital video systems worldwide.

When a video signal is first generated, it is an analog signal with multiple components necessary for reception thereof. In particular, a typical video camera provides at its output a "composite" analog video signal containing six components: (1) horizontal sync, (2) vertical sync, (3) composite sync, (4) luminance, and (5) and (6) the two chrominance signals. The sync signals are necessary in order for an analog receiver to "lock in" on the video signals so that the sequential frames of video data can be displayed logically on the receiver's video screen. A typical analog video signal, in the standard "RS-170" format, is depicted in FIG. 1.

There are two main aspects of the traditional analog video signal that make it somewhat difficult to deal with: first, since the signal is analog, each time it is reproduced or "repeated" its distortion levels increase and its signal-to-noise ratio decreases; and, second, the receiver must be specially set up to synchronize with the particular analog sync signals.

The difficulties encountered in dealing with analog video signals are disclosed, for example, in U.S. Pat. No. 4,905,085 issued to mark E. Faulhaber on Feb. 27, 1990, entitled "Synchronous Sampling System." The complexity of the so-called "frame grabber" circuitry described therein exemplifies the need for and convenience of having an alternative serial digital signal that represents the video image in a computer-friendly format.

It is therefore an object of the instant invention to provide a video camera that produces a digitally-coded output signal in the form of a serial digital message that can be conveniently repeated without adding distortion or noise, and that does not require special synchronization apparatus for reception, and that can be conveniently digitally buffered or stored as desired.

SUMMARY OF THE INVENTION

The invention is directed to a specialized video camera that produces an asynchronous digital signal in a "message" format suitable for reception, buffering, storing, and decoding by a variety of computer-graphics systems without the need for specialized synchronous reception hardware. The message arrangement for the digital message includes a "header" comprising a time stamp, type, and digital format, followed by the sequential digitized YUV data with or without simple frame demarcations (i.e. descriptors).

By simplification of the message in this manner, any suitable digital processor (and its associated storage and display apparatus) which are programmed properly to respond to the header information contained at the beginning of the message will be able to receive and store and display the transmitted video information as needed. In this manner the video signal can, if desired, be handled on a basis other than "real time," thus, for example, allowing for delayed or "slower than normal" processing of the signal.

DETAILED DESCRIPTION

Figure 1:
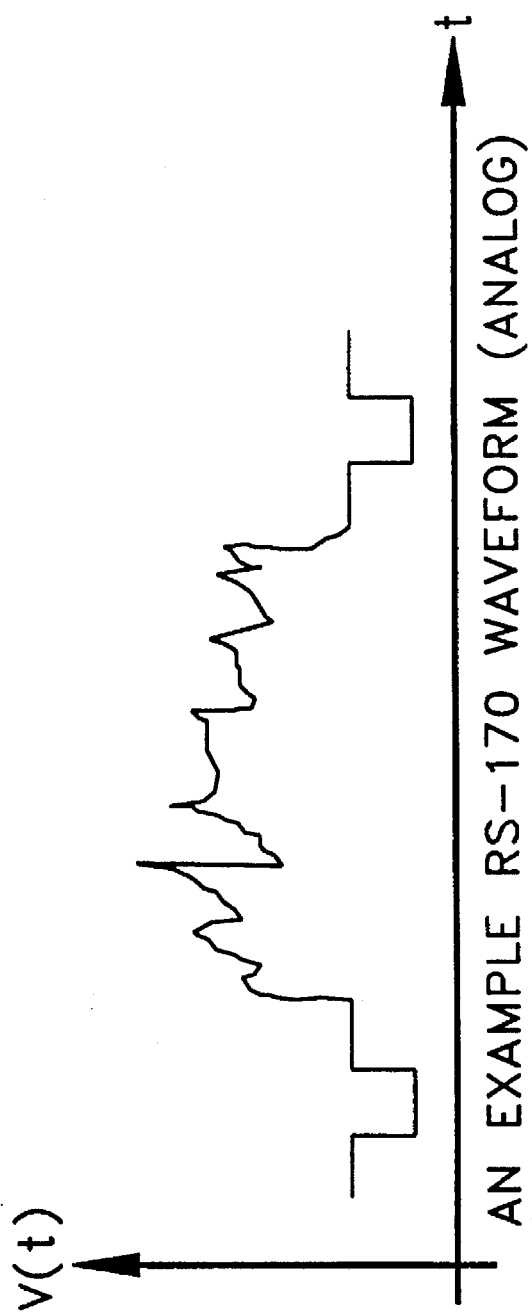
FIG. 1 shows a typical analog video camera output signal.
Figure 2:
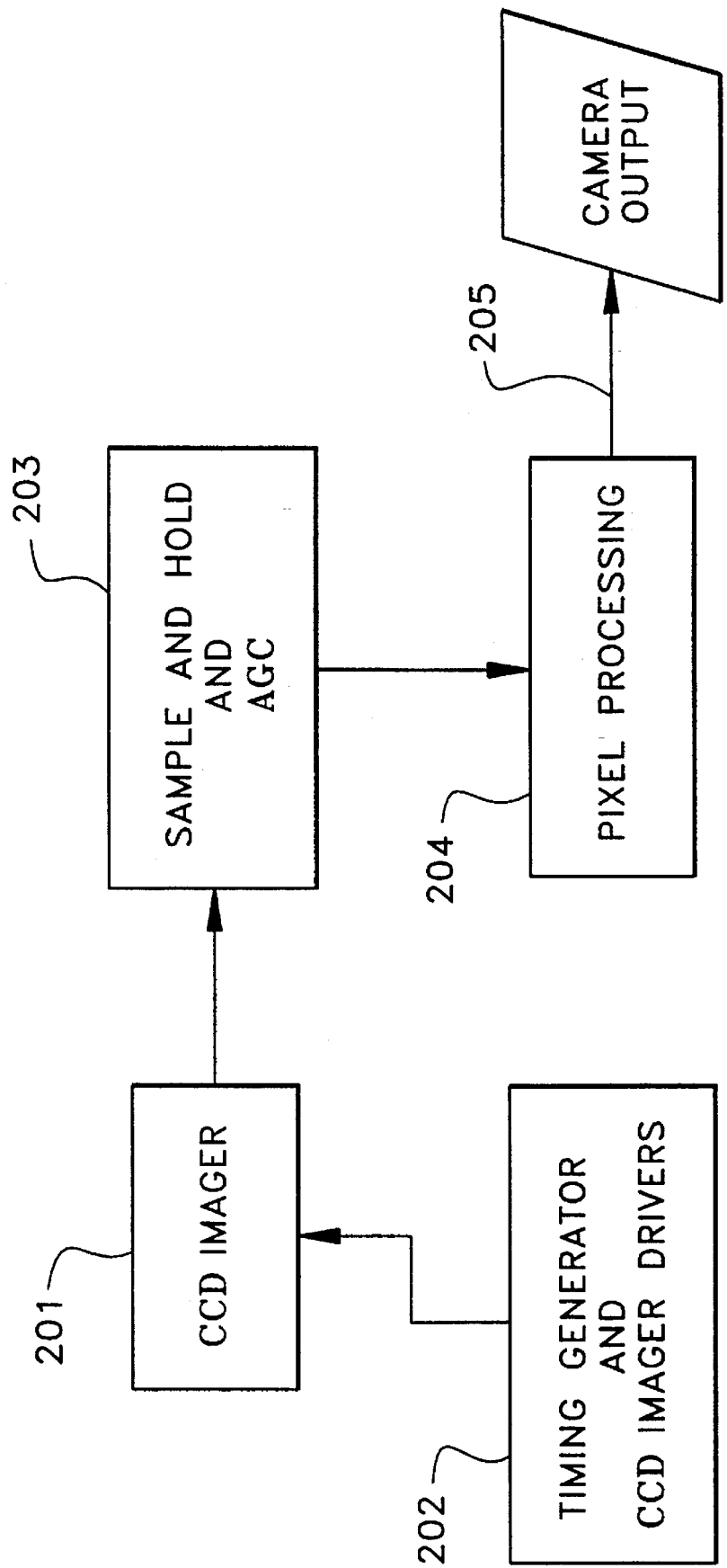
FIG. 2 is a block diagram of a traditional video camera system.

Referring now to FIG. 2, therein depicted is a typical analog video camera system, including CCD Imager 201 regulated by Timing Generator and CCD Imager Driver 202. The output of CCD Imager 201 goes to the Sample and Hold and Automatic Gain Control Unit 203, which in turn drives the pixel processor 204 which produces the camera output signal along transmission line 205, the output produced is an analog varying voltage video signal such as depicted in FIG. 1. This signal can be transmitted for "real time" display, or can be recorded on an analog video recorder (VCR) (not shown).

Figure 3:
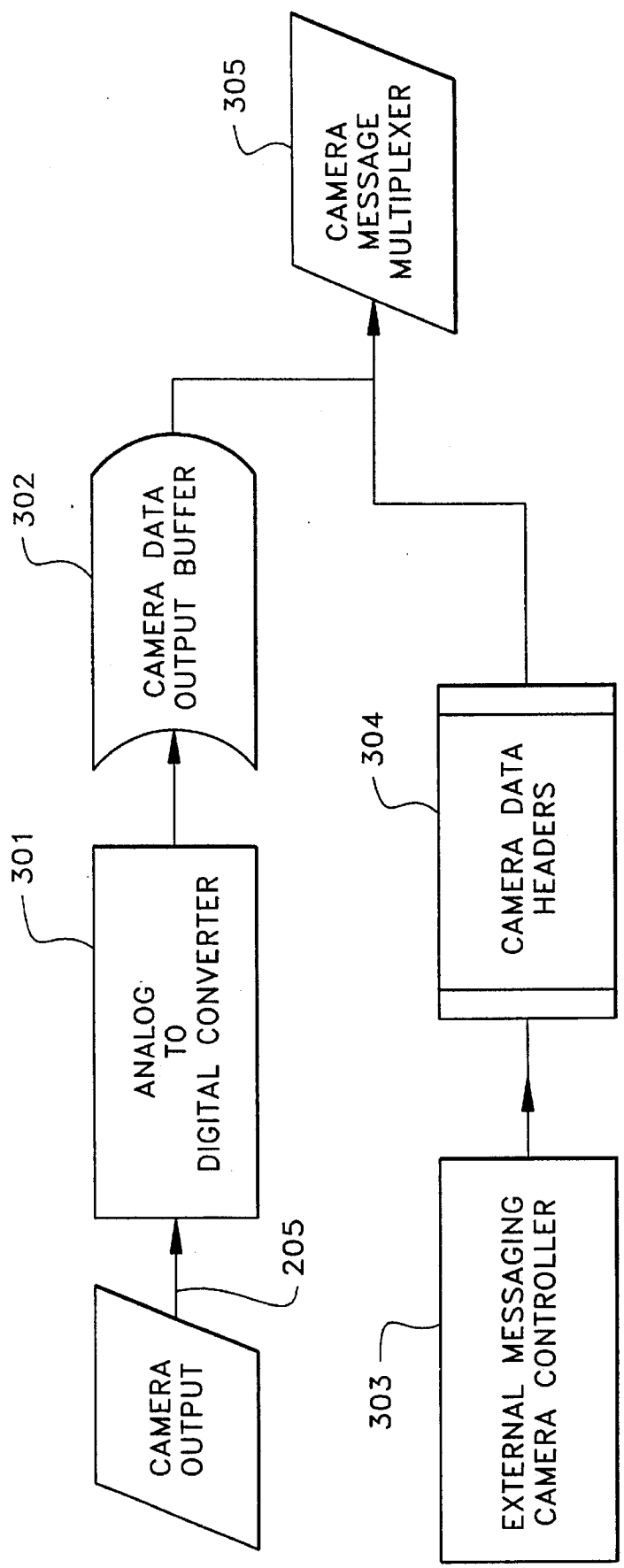
FIG. 3 depicts the video digitizing and multiplexing system of the instant invention.
Figure 4:
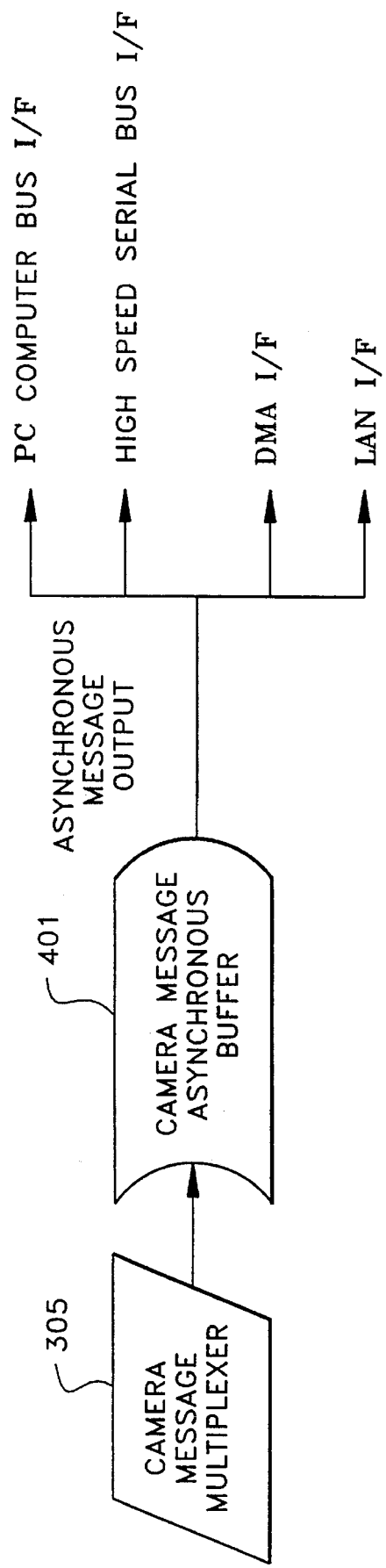
FIG. 4 shows the asynchronous output capabilities of the instant invention.

Now referring to FIG. 3, the system of the instant invention receives the above-described analog video signal via line 205, converts this signal to a digital format via Analog to Digital Converter 301, and buffers the resulting digital signal via Camera Data Output Buffer 302. External Messaging Camera Controller 303 creates Camera Data Headers 304 that are multiplexed with the buffered digital signal by Camera Message Multiplexer 305. The Camera Data Headers comprise a Time Stamp, a Type indicator, and a Format indicator. The Multiplexer 305 combines the Headers with the digital video signal as follows: {[Headers]; [Y data]; [U data]; [V data]}. This combined output signal of Multiplexer 305 is then buffered by Camera Message Asynchronous Buffer 401 as shown in FIG. 4. The output of Buffer 401 can then be sent and received as a conventional asynchronous digital message that is compatible with standard computer systems as depicted in FIG. 4. This digital output can be one of many different types: e.g. (1) digitized RS-170; (2) CCIR-601; (3) CCD Imager Array (for example, Red, Cyan, Magenta, and Green); or (4) a specialized scaled digital video signal. The camera data header is used to specify initially which particular type is being used.

It is to be understood that Applicant's invention is not limited to the above described embodiments, but rather is defined by the appended claims and their fair equivalents.

What is claimed is:

1. A video camera for generating an asynchronous digital video signal having header data, comprising:

means for generating an analog video signal representing a captured video image;

means for converting the analog video signal to a digital video signal;

means for generating the header data for identifying qualities of the digital video signal;

means for multiplexing the header data onto the digital video signal to provide a multiplexed digital video signal;

means for asynchronizing the multiplexed digital video signal to provide an asynchronous digital video signal, wherein:

the asynchronous digital video signal is processed by a computer graphics system programmed to respond to the header data.

2. The camera of claim 1, wherein the means for asynchronizing comprises an asynchronous buffer.

3. The camera of claim 1, wherein the header data includes at least one of a time stamp, type indicator or format indicator.

4. The camera of claim 3, wherein the header data includes at least the type indicator, wherein the type indicator identifies the digital video signal as one of digitized RS-170, CCIR-601, CCD imager array or a specialized scaled digital video signal.

5. The camera of claim 3, wherein the header data includes at least the format indicator, wherein the format indicator identifies the digital video signal as one of YUV or YIQ.

6. The camera of claim 1, wherein the header data is multiplexed onto the beginning of the digital video signal.

7. A video camera for generating an asynchronous digital video signal having header data, comprising:

means for generating an analog video signal representing a captured video image;

means for converting the analog video signal to a digital video signal;

means for generating the header data, wherein the header data includes a time stamp, type indicator and format indicator;

means for multiplexing the header data onto the beginning of the digital video signal to provide a multiplexed digital video signal;

means for asynchronously buffering the multiplexed digital video signal to provide the asynchronous digital video signal wherein the asynchronous digital video signal is processed by a computer graphics system programmed to respond to the header data.

8. A video camera for generating an asynchronous digital video signal having header data, comprising:

an analog video signal generator for generating an analog video signal representing a captured video image;

an analog to digital converter for converting the analog video signal to a digital video signal;

a controllable header data generator for generating the header data for identifying qualities of the digital video signal;

a multiplexer for multiplexing the header data onto the digital video signal to provide a multiplexed digital video signal;

an asynchronous buffer for asynchronously buffering the multiplexed digital video signal to provide the asynchronous digital video signal, wherein:

the asynchronous digital video signal is processed by a computer graphics system programmed to respond to the header data.

9. The camera of claim 8, wherein the header data includes at least one of a time stamp, type indicator or format indicator.

10. The camera of claim 9, wherein the header data includes at least the type indicator, wherein the type indicator identifies the digital video signal as one of digitized RS-170, CCIR-601, CCD imager array or a specialized scaled video signal.

11. The camera of claim 9, wherein the header data includes at least the format indicator, wherein the format indicator identifies the format as one of YUV or YIQ.

12. The camera of claim 8, wherein the header data is multiplexed onto the beginning of the digital video signal.

* * * * *